(No Model.)
G. BEHRENFELD.
HAY PRESS.
No. 505,999. Patented Oct. 3, 1893.
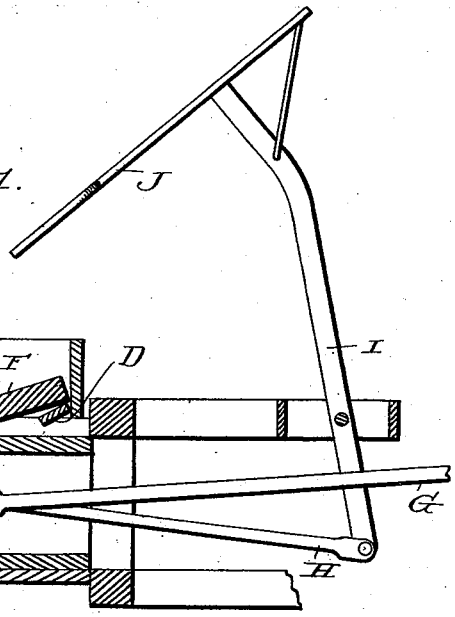
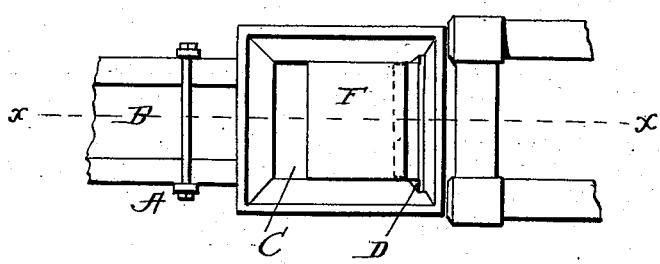
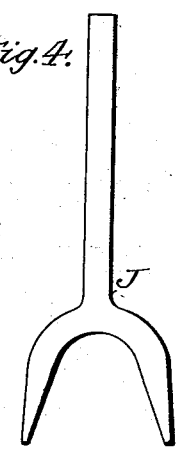
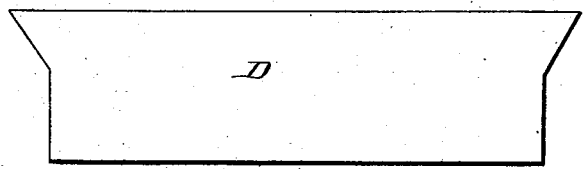
Witnesses:
C. H. Raeder
K. F. Matthews
Inventor
George Behrenfeld
By James J. Sheehy
Attorney

UNITED STATES PATENT OFFICE.

GEORGE BEHRENFELD, OF HERON LAKE, MINNESOTA.

HAY-PRESS.

SPECIFICATION forming part of Letters Patent No. 505,999, dated October 3, 1893.

Application filed April 17, 1893. Serial No. 470,792. (No model.)

*To all whom it may concern:*

Be it known that I, GEORGE BEHRENFELD, a citizen of the United States, residing at Heron Lake, in the county of Jackson and State of Minnesota, have invented certain new and useful Improvements in Baling-Presses; and I do declare the following to be a full, clear, and exact description of the invention, such as will enable others skilled in the art to which it appertains to make and use the same.

My invention relates to improvements in baling presses; and it has for its general object to provide a baling press with a cheap and simple means whereby the follower may be automatically and accurately deposited in the baling chamber and carried to its place beyond the retaining springs or devices, without danger of breaking the follower or other parts of the machine and without the necessity of the operator exposing his arms to danger.

With the foregoing ends in view the invention will be fully understood from the following description and claim when taken in connection with the accompanying drawings, in which—

Figure 1, is a vertical, longitudinal section of a baling press embodying my invention; said section being taken in the plane indicated by the line x, x, of Fig. 2. Fig. 2, is a detail plan view of the casing or frame and the feed hopper. Fig. 3, is a detail view of the follower rest removed, and Fig. 4 is a detail front elevation of the fork.

Referring by letter to said drawings: A, indicates the casing or frame of a baling press, which may be of any approved form and construction; B, indicates the baling chamber thereof; and C, indicates the feed hopper, which is arranged upon the casing or frame and communicates with the chamber B, as shown. This feed hopper C, is provided adjacent to the lower edge of its transverse wall with a fixed, transverse strip D, which is inclined substantially as shown and is designed to serve in conjunction with the reciprocatory plunger E, to support the follower F, as will be presently described.

The plunger E, may be actuated by any approved motor through the medium of the pitman G, and it is connected by the pitman H, with the lower end of the forked lever I, as shown in Fig. 1. This fork lever is fulcrumed in the frame of the machine and it is provided at its upper end with the feed lever J, which is so disposed that it will enter the hopper A, when the plunger E, is moved rearwardly so as to force the hay down into the baling chamber.

In the practical operation of my invention the attendant places the hay to be pressed in the hopper C, and it is forced down into the baling chamber by the fork J, and is pressed by the plunger E, against the follower which has previously been placed in the baling chamber. When a sufficient quantity of hay has been fed into the baling chamber, and while the plunger is making its rearward stroke, the operator simply places the follower F, upon the plunger and strip or rest D, as shown, when the plunger receding allows it to drop down into the baling chamber. When the follower drops into the baling chamber it will be supported on one side by the hay in advance of the mouth of the chamber and on the other side by the fork J, which descends as the plunger recedes and engages and holds the follower in an upright position until the plunger on its forward stroke engages and presses the follower to its seat beyond the retaining springs or device (not illustrated). Thus it will be seen that the follower may be placed in position without the necessity of the operator subjecting himself to danger, and without the liability of damaging any of the parts which is an important desideratum.

Having described my invention, what I claim is—

In a baling press, the combination with a reciprocatory plunger; of a baling chamber, the upper wall of which is provided with an opening to admit the insertion of the material to be pressed, the feed hopper arranged above and surrounding the opening in the baling chamber, the transverse, inclined strip D, fixed in the feed hopper at one end thereof, and a fork connected with and operated by the reciprocatory plunger, substantially as and for the purpose set forth.

In testimony whereof I affix my signature in presence of two witnesses.

GEORGE BEHRENFELD.

Witnesses:
J. G. HELLEN,
JNO. L. GESSELL.